(12) United States Patent
Faur et al.

(10) Patent No.: US 7,099,780 B2
(45) Date of Patent: Aug. 29, 2006

(54) METHOD FOR INTERPRETING DATA MEASURED IN A HYDROCARBON WELL IN PRODUCTION

(75) Inventors: Marian Faur, Cedex (FR); Remi Marcus, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/523,886

(22) PCT Filed: Jul. 22, 2004

(86) PCT No.: PCT/EP2003/050606

§ 371 (c)(1),
(2), (4) Date: Feb. 7, 2005

(87) PCT Pub. No.: WO2004/061268

PCT Pub. Date: Jul. 22, 2004

(65) Prior Publication Data

US 2006/0041382 A1    Feb. 23, 2006

(30) Foreign Application Priority Data

Sep. 3, 2002    (GB)    ................... 0220389.1

(51) Int. Cl.
   *G01F 1/00*    (2006.01)
(52) U.S. Cl. ...................................................... 702/45
(58) Field of Classification Search .................. 702/45
   See application file for complete search history.

(56) References Cited

U.S. PATENT DOCUMENTS 3,909,603 A    9/1975   Nicolas
4,441,362 A *  4/1984   Carlson ................... 73/152.31
5,561,245 A    10/1996  Georgi et al.
5,586,027 A    12/1996  Carlson et al.
5,633,470 A    5/1997   Song

FOREIGN PATENT DOCUMENTS

EP    0362011 A    4/1990
EP    0519809 A    12/1992

* cited by examiner

*Primary Examiner*—Michael Nghiem
*Assistant Examiner*—Cindy D. Khuu
(74) *Attorney, Agent, or Firm*—Victor H. Segura; Brigitte L. Echols (57) ABSTRACT

The invention concerns a method for calculating the relative volumetric flow-rates of at least one of the phases of a multiphase effluent flowing in a well. Firstly, the local volumetric fractions and/or velocities of the phases across a section of the wall at a certain depth is acquired. Then, the local volumetric fraction and/or velocity measurements is/are corrected in order to make them consistent with each other and/or with the effluent flow conditions. Subsequently, selection of a suitable flow model mathematically representing the effluent flow is selected. Then, The local volumetric fraction measurements and/or the local velocity measurements are interpolated by the selected flow model in order to obtain a volumetric fraction profile and/or a velocity profile for at least one phase of the effluent across the section of the well at the depth. Finally, the relative volumetric flow-rates of the at least one phase are calculated by integration of the volumetric fraction and/or velocity profiles over the section of the well at the depth.

12 Claims, 7 Drawing Sheets

METHOD FOR INTERPRETING DATA MEASURED IN A HYDROCARBON WELL IN PRODUCTION

BACKGROUND OF THE INVENTION

The invention relates to a method for interpreting data acquired in a hydrocarbon well in production.

More precisely, the method of the invention is designed to ensure that the data collected in the well during production are correctly interpreted in order to know precisely the flow conditions, namely the relative volumetric flow-rates, inside the well.

To ensure the monitoring and diagnostic functions in hydrocarbon wells in production, a certain amount of data, mainly physical data, has to be acquired. The data essentially relate to the multiphase fluid that flows in the well (flow rate, proportions of its various phases, temperature, pressure, etc.). They can also relate to certain characteristics of the well itself (ovalization, inclination). These data will, for example, permit to quantitatively identify, at all depths, fluid entry zones and fluid exit zones in order to be able to re-plug or re-perforate the corresponding zones when needed. This monitoring will thus permit to minimize surface production of undesired fluids like water and maximize the production of valuable fluids like oil.

To acquire said data, as shown in particular by document FR-A-2 732 068, a conventional solution consists in taking, firstly, an overall measurement of the speed of the fluid flowing in the well, by means of a spinner placed in the axis of the well, and secondly, measurements (that might be local) enabling the proportions of the various phases of the fluid in certain regions of the well to be determined. The speed measurement and the hold-up measurements are taken at various depths. The hold-up measurements are taken by means of various sensors that can be resistivity sensors, optical sensors, etc.

To determine the flow rate of the various phases of the fluid flowing in the well, the flow rate of the fluid over the section of the well is calculated from the measurements taken by said existing apparatus by multiplying the overall speed measurement (consisting in the measured speed at the center of the well multiplied by a coefficient typically between 0.6 and 1) by the section of the well at the place where the measurement is taken. The proportion relating to the phase under consideration as determined by the sensor is then applied to said overall flow rate.

However, it is known that the distribution of the various phases of the fluid flowing in an oil well varies depending on whether the well is vertical, inclined or horizontal. Because of the difference in density of the various phases of the fluid, said phases become progressively more stratified with increasing inclination of the well. Thus, in the case of a three-phase fluid containing water, oil and gas, the three phases tend to flow one on top of the other when the well is horizontal or greatly inclined. Consequently, the distribution of the phases in the well (hold-up of the phases) and the speed of each phase are not uniform over the section of said well: a sharper description of these functions over the well cross-section is needed to calculate the flow rate of each phase.

This description will be achieved with sensors (for example local probes and mini-spinners) located on various known points of the cross section of the well as stated in the document WO 01/11190. This document is based on the observation that the flow rate of any one phase of the fluid is not equal to the product of the overall (average) speed of the fluid multiplied by the section of the well and by the volumetric fraction of said phase in the flowing fluid, but is rather the product of the average speed of the phase under consideration multiplied by the section and by the volumetric fraction of said phase.

The interpretation of these data, collected at each local spinner and probe in order to calculate relative volumetric flow rates at all depths, is thus becoming a very important procedure in order to estimate precisely the behavior of each fluid constituting the well effluent. This interpretation actually requires interpolation of the values on the basis of a flow model applied to the effluent flow, said model varying depending on the current flow conditions.

BRIEF SUMMARY OF THE INVENTION

It is thus an object of the invention to provide a method for calculating the relative volumetric flow rates of at least one of the phases of a multiphase effluent flowing in a well, said method comprising a first step of acquiring local volumetric fractions and velocities of said phases across a section of the well at a certain depth, characterized in that said method further comprises:

- corrections of said local volumetric fractions and/or velocity measurements in order to make them consistent with each other and/or with the effluent flow conditions;
- selection of a suitable flow model mathematically representing the effluent flow;
- interpolation of said local volumetric fractions measurements and said local velocity measurements by the selected flow model in order to obtain a volumetric fraction profile and a velocity profile for at least one phase of the effluent across said section of the well at said depth.
- calculation of the relative volumetric flow-rates of said at least one phase by integration of said volumetric fraction and velocity profiles over said section of the well at said depth.

This method of calculating the volumetric flow rates of the phases of the effluent allows considering any factor related to the measurements means or the flow conditions that can modify or distort the local measurements.

BRIEF DESCRIPTION OF THE DRAWINGS

Additional objects and advantages of the invention will become apparent to those skilled in the art upon reference to the detailed description taken in conjunction with the provided figures.

DETAILED DESCRIPTION OF THE INVENTION

As it has already been explained by the applicants in WO 01/11190, in order to identify the volumetric fractions of the fluids of a multiphase effluent, at a given depth of the well, and the relative volumetric flow rates of said fluids, one needs to determine the local volumetric fractions (usually called hold-up) of each fluid (typically oil, water and gas), and the local velocity of each of these. As stated in this document, the volumetric flow rate $Q_i(z,t)$ at a time (t) for a given fluid (i) (where i can be w, water, o, oil, g, gas) is calculated via a simple integration of a local fluid hold-up ($h_i$) multiplied by a local fluid velocity ($v_i$) over the well cross-section (S) at a current depth (z) according to the following principle:

$v_i$ and $h_i$ are two functions of the tri-dimensional position and of time (x, y, z, t).

Let z be the direction perpendicular to the well cross-section at current depth, and x the intersection of the vertical plane and the pipe cross-section. Then at time t, and for i=w, o or g the local volumetric flow rate is:

$$Q_i(z, t) = \int_S v_i \cdot h_i \cdot dS$$

If the well is vertical, the dynamics of the system is such that the velocity and hold-up are still a function of the fluid and of the depth (z), but are uniform (in a first approximation) over the well cross-section S. Then the above relation simplifies to:

$Q_i(z, t) = Vi(z).Hi(z).S(z)$ where Vi and Hi are respectively the constant values of $v_i$ and $h_i$ over the cross-section S.

If the well is not vertical, the former simplification cannot be made because $h_i$ and $v_i$ are not uniform over the section anymore. A sharper description of the velocity and hold-up profiles is thus needed over the well cross-section in order to calculate $Q_i$ at each depth. In a first step of the method according to the invention, measurements of the local hold-up for each phase and of local velocities are collected via local sensors located on various known positions of the cross-section.

So, in the case of a multi-phase fluid flowing in a deviated well, the calculation of $Q_i$ becomes a more complex procedure because it involves interpolation of the measured values on the basis of flow models that can vary depending on the current flow conditions: in this kind of interpretation, the deviation is a major influence parameter and the range of flow patterns that can be encountered in those wells is very broad. It is thus very important to take any factor that can modify the flow pattern into account but also to carefully check any local measurement collected because little deficiencies or errors can lead to large mistake in defining the flow model and consequently the local volumetric flow rates.

The method of the invention has thus been developed in order to overcome a maximal number of errors that can pollute the local volumetric fraction and velocity measurements acquired in the well. Consequently, based on measurements that are very close to the real flow conditions, it is possible to determine the most suitable flow model leading to reliable phase volumetric fraction and velocity profiles over the well cross-section. The main steps of the method of the invention comprise a correction step, a step where the flow model is chosen, an interpolation step and a calculation step in order to determine the relative volumetric flow-rates. However, it is important to notice that these steps can be achieved in almost any order. For example, it is possible to firstly choose the flow model and after that, correct the measurements. It is also possible to do the same step twice. For example, it is possible to choose a flow model, achieve the corrections step and then, depending on the corrections that have been done, chose a second flow model. It is also possible to handle part of the corrections on the local measurements, choose the flow model and then correct these measurements again. Finally, only part of the corrections that will be explained in detail here under can be done and the corrections step may comprise a varying number of corrections.

The method of the invention requires the acquisition of two major local measurements: the local hold-up (volumetric fractions of the different phases) and the local velocities, as it has been explained above. However, other data are also needed to calculate the relative volumetric flow rates of each phase: the cable velocity and the geometry of the well. The local velocity measurements being acquired with a tool that has been lowered in the well (note that those data can be acquired either when the tool is lowered or driven back), it is necessary to subtract this cable velocity from said local velocity measurements. The geometry of the well comprises knowing its deviation and its diameter (when it is supposed to be circular) or its ovalization. It is also important to know the position of the tool in the well (for example relative bearing: centralization, non-centralization, tilt of the tool) in order to calculate the position of the sensors. Knowing the rheology (viscosity, density . . . ) of the fluids will also help optimizing the interpretation of the data.

The local hold-up measurements allow determining the local volumetric fractions of fluids present at a certain depth of the well. Depending on the effluent composition, the measurement means may either permit a tri-phase differentiation (oil, water and gas) or a bi-phase differentiation (oil and water with electrical probes for example). For example, the measurement means can be some local electrical probes that will measure the water hold-up and/or some local optical probes that will measure the gas hold-up. If the flow is tri-phase, combination of these two kinds of probes will be needed: the oil hold-up will be easily deduced from the two other hold-ups. This combination of the measurements of all the probes, in order to deduce the oil hold-up, can be done at any step of the method of the invention. If the effluent is bi-phase, only one type of probes will be necessary and there won't be any combination. If the effluent is mono-phase the hold-up issue is irrelevant. The measurement means may also comprise some spinners that will acquire local velocities values, see WO 01/11190.

Described below are the various corrections that can be applied to the local measurements, any of these corrections being included or not in the corrections step of the method of the invention, depending on the measurement means and the flow conditions.

In a first embodiment, the corrections step of the invention may comprise the correction of known systematic measurement errors. Actually, the accuracy of the measurement means is often affected by systematic errors. Generally, they cannot be accounted for in the sensor calibration, typically because they depend on some other measured parameter(s) that will only be reachable when the measurements are collected. In a preferred embodiment of the invention, this correction is the first one of the corrections step. For example, the correction of systematic errors will concern the spinners. The efficiency of the spinners might be affected by the position of this sensor on the tool. Depending on this position, the velocity measurements can be affected by the flow perturbations induced by the tool itself. The correction to apply will then be a fixed coefficient in a simple correction model. However, it can also be—in an extended correction model—a function of the well cross-section area, of the tool position (relative bearing) and of the actual measured velocity, for example. Other systematic errors can also be made on local hold-up sensors or optical probes.

Figure 1A:
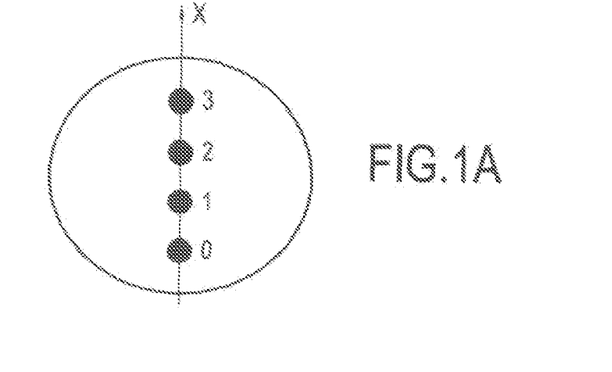
FIGS. 1a and 1b represent a schematic example of a first correction step that can be done on the velocity measurements.
Figure 1B:
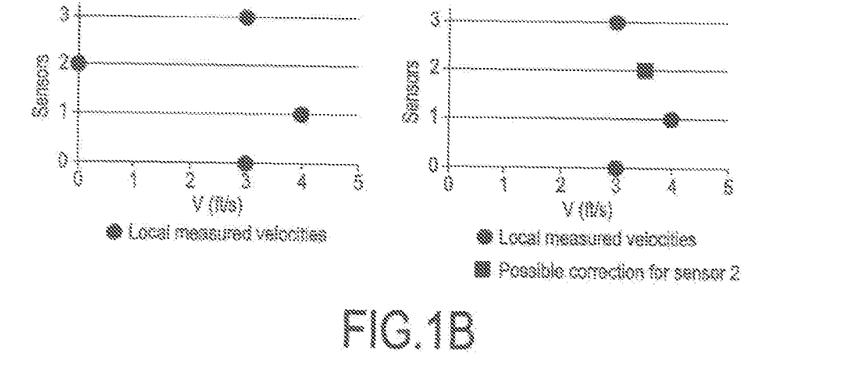

In a second embodiment, the corrections step may also comprise a check of the local measurements acquired for the phase volumetric fraction and/or for the velocity. Actually, the set of local measurements (phase volumetric fractions or velocities) that has been acquired by the measurement means may present some incoherence that are obvious enough to be detected before any other processing is run. The purpose of this correction is thus to check that all measured data of the same kind are coherent between themselves. If incoherence is identified, a correction will be implemented. FIGS. 1a and 1b represent an example of this correction, achieved on the local velocity measurements. FIG. 1a shows the vertical repartition of the velocity sensors respectively located on positions 0, 1, 2, 3 in the well cross-section where the flow is stationary and FIG. 1b shows the correction of an erroneous measurements set.

If sensor 1 and sensor 3 measure a positive (non zero) velocity value, then sensor 2 (located between sensors 1 and 3) should also measure a positive (non zero) value. If sensor 2 measures a negative or 0 value, then its measurement can be considered erroneous. A simple correction is to decide to ignore this measurement while conducting the following interpretation. Another solution is to set sensor 2 value as the average of both sensor 1 and sensor 3 values as represented on FIG. 1b.

Assume now that FIG. 1a represents a two-phase water/oil stationary flow and that 4 electrical probes are positioned along the vertical diameter of the well cross-section, said probes being located with a number from 0 to 3 from bottom to top. If sensor 0 shows 0% water hold-up and probes 1 or 2 show strictly positive water hold-up, then at least one sensor measurement has to be declared erroneous because this set of measurements does not comply with basic physical principles. A simple correction is either to ignore this measurement or to give the measurement of sensor 0 the same value as the measurement of sensor 1 for instance.

The corrections step may also comprise a check for mutual compliance of the data. Once the simplest measurement errors have been corrected, a more advanced check can be made. After having compared coherence of the measurements of the same type, one needs to check for their mutual coherence and correct them when identified. Typically, the local hold-up measurements will be compared with the local velocity measurements.

Figure 2A:
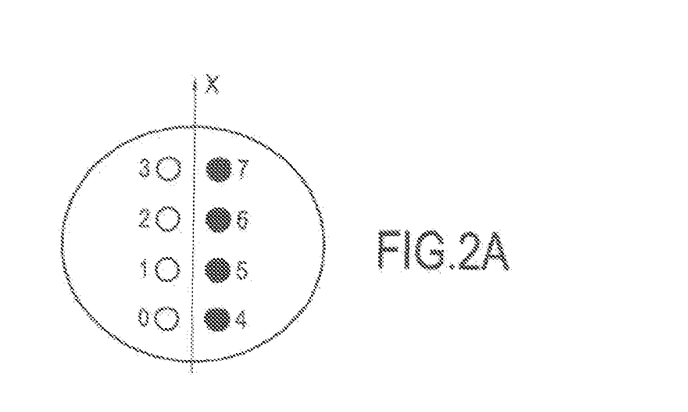
FIGS. 2a and 2b represent a schematic example of a second possible correction step for the set of local velocity and hold-up measurements.
Figure 2B:
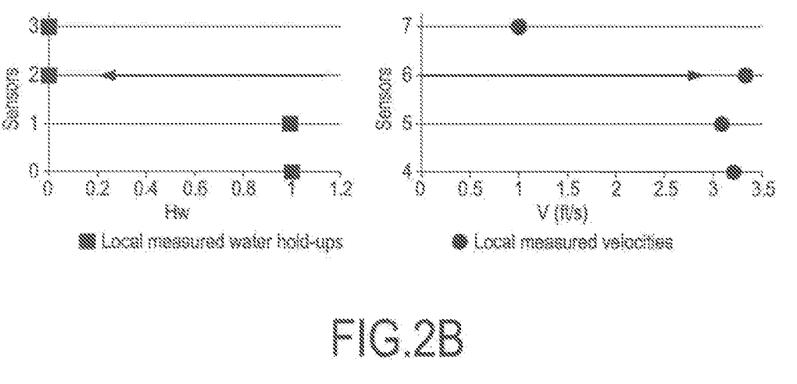

FIGS. 2a and 2b represent an example of this correction. In the case of a two-phase stratified oil/water flow (assumed to be stationary), the velocity of water and the velocity of oil are—approximately—both uniform. Let us suppose the hold-up and velocity sensors are coupled: pairs of one hold-up sensor and one velocity sensor are co-located along the vertical diameter of the well cross-section, as showed on FIG. 2a where the velocity sensors, numbered 0 to 3, are on the left hand-side of the flow section and the water hold-up sensors, numbered 4 to 7, are located on the right hand-side of it. Note that in the following <<o>> refers to oil, <<w>> refers to water and <<g>> refers to gas.

If the deviation is different from 90° (horizontal well), Vo and Vw are different. Let us take the case when the deviation is 89°. Then Vo is superior to Vw, due to known physical principles.

If the velocity measurements are the ones presented on FIG. 2b on the right hand-side diagram, then there is an obvious incoherence between the velocity measurements and the hold-up measurements showed on the left hand-side diagram. Indeed, the hold-up 2 indicates that the oil/water interface is below its current position while the velocity sensor 6 tends to show that this interface is above said sensor. Then depending on the relative confidence towards measured velocity and measured hold-up, a correction on one of both (possibly both) data has to be implemented.

It is also possible to add to the corrections step a further correction aiming at refining the set of measurements. This correction is based on a closer analysis of the velocity measurements in order to inject the result of this analysis into the set of hold-up measurements via a fictive point that will precise this hold-up set. It is also possible to handle the reverse procedure and analyze the set of hold-up measurements in order to inject a fictive velocity measurement that will sharpen the result of the analysis of the velocity set.

Figure 3A:
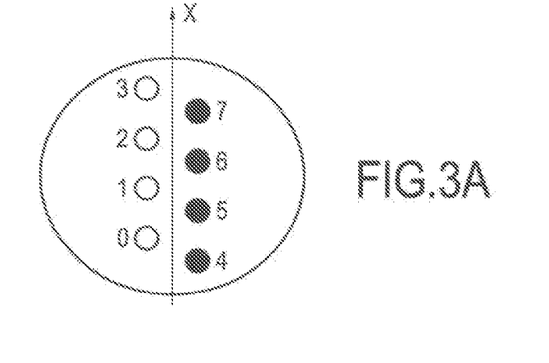
FIGS. 3a and 3b are a schematic example of a third possible correction step.
Figure 3B:
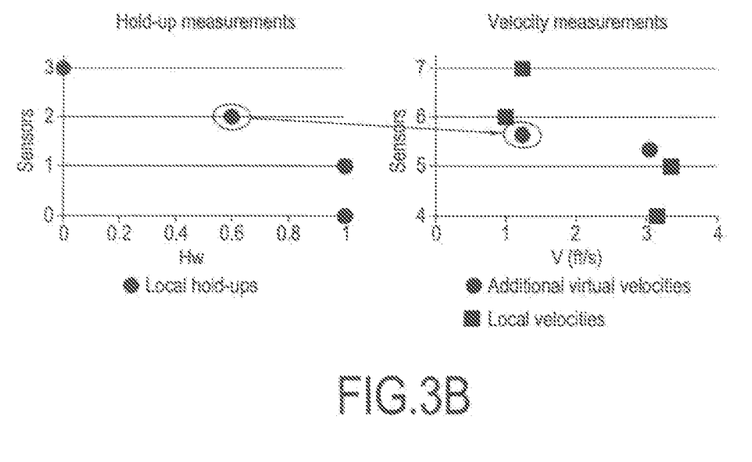

An example of this refining correction can been seen on FIGS. 3a and 3b. The flow pattern is supposed to be a two-phase stratified oil/water flow (stationary) and the velocity of water and the velocity of oil are approximately both uniform. On FIG. 3a, the hold-up probes and the velocity sensors are not co-located along the vertical diameter of the well cross-section but are cross-positioned, hold-up sensors, numbered 0 to 3, being on the left hand-side of the well and velocity sensors, numbered 4 to 7, on the right hand-side. As represented on FIG. 3b, the set of hold-up measurements is used to improve the set of velocity measurements. The hold-up sensor 2 measures 60% of water volumetric fraction. This indicates that this sensor is positioned on the oil/water interface. However, the velocity sensors do not see this interface because they are either located in the oil or in the water. Consequently, from the hold-up measurements giving the position of the interface, it is possible to inject this information in the velocity measurements. This can be done by adding virtual velocity points just above and below the interface respectively close to the upper real measured point 6 and the lower real measured point 5.

If the selected model is a two phase liquid/gas flow in a near horizontal well (90° of deviation for example), it is possible that the hold-up sensors do not detect any gas because this latter flows on the very top of the well cross section. If the highest velocity sensor is above the highest hold-up sensor, this velocity sensor may detect an increased velocity. This feature will indicate the presence of gas while the non-corrected hold-up interpolation profile would have ignored this presence. Consequently, a virtual gas hold-up sensor can be added at the same position as the highest velocity sensor and its measured value can be set as it saw 100% of gas. (with 90° of deviation and for current flow velocities, it is reasonable to have a stratified flow).

It is important to notice that the corrections step may comprise one, several or all of these correction procedures. Moreover, these corrections may be indifferently achieved each one after the other, in any order, or it is also possible to include between one of them the selection of the flow model that will permit to interpolate these sets of measurements.

Figure 8:
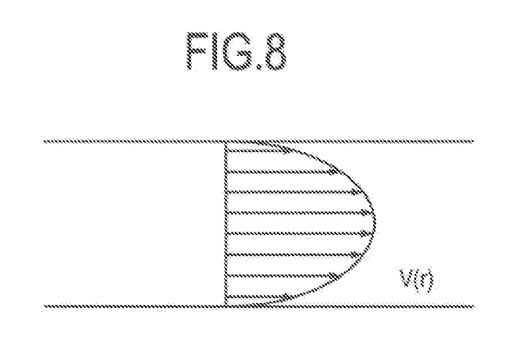
FIG. 8 shows a representation of flow velocity in a pipe according to the Poiseuille model.

The flow model is a combination of predetermined hold-up profile and velocity profile that correspond to a known flow pattern. Different flow models have been created in order to describe any type of flow that can be encountered in a well. Examples of flow models are known:

The Poiseuille model, represented in FIG. 8, is the classical one to represent a laminar mono-phase flow in a cylindrical vertical pipe. This model fits a mono-dimension binomial function of the radius to the velocity measurements. Hold-up measurements are irrelevant. However, this model will not be used in many cases concerning a well effluent because velocities are typically too high for the flow to remain laminar, and the flow is turbulent in most cases.

Figure 9:
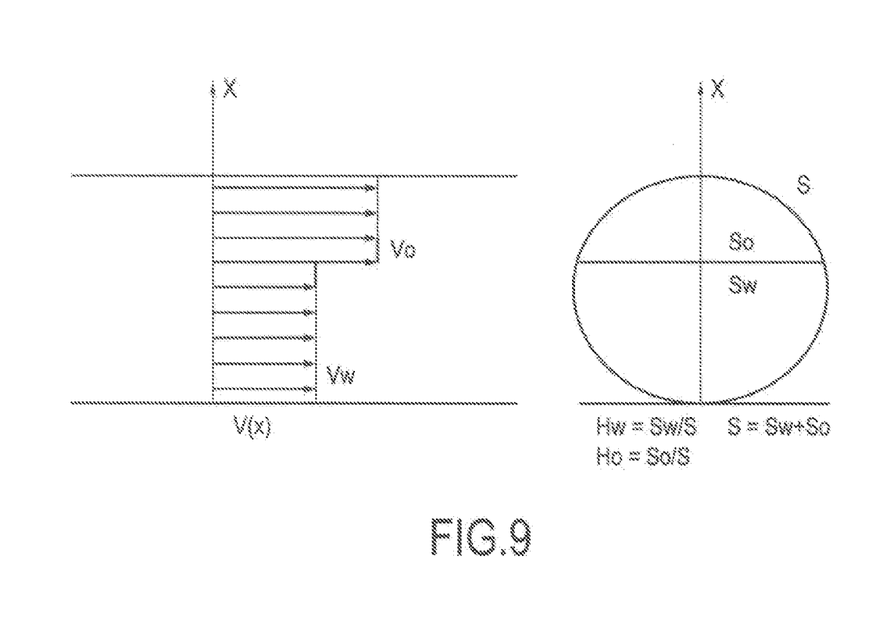
FIG. 9 shows a representation of flow velocity in a pipe according to the model of EP 0519809.

Another model has been exposed in the applicant's patent numbered EP0519809 that fits a segregated oil/water flow. In this model both oil and water velocities are supposed to be uniform. This model is based on the assumption that oil velocity and water velocity are constant It can be represented as shown in FIG. 9.

$V_o$ and $V_w$ represent respectively the velocity of oil and the velocity of water across a section S of a cylindrical pipe. $H_w$ and $H_o$ represent respectively the volumetric fraction of water and the volumetric fraction of oil in the measured cross-section. $S_w$ and $S_o$ respectively represent the surface of pipe that is covered with oil in the cross-section and the surface of pipe that is covered with water in said cross-section.

The choice of the flow model may be either made by a person who is in charge of running the method of the invention or by an automatic decision chain. In case of a "manual" decision, it is the person that is supervising the method of the invention who is going to select a given flow model according to his own knowledge of the effluent flow, the well deviation. . . . In case the selection of the flow model is automatic, the process will check several predetermined criteria in order to decide which flow model will be used. For example, it will check whether the flow is an oil/water flow or not: if the electrical probes detect oil and water and the optical probes detect no gas, the flow is a bi-phase oil/water flow. Then, the process will check whether the flow is stratified or not: if the deviation is close to horizontal and measured velocities are all below a maximum value (e.g. 2 m/s in a pipe having a diameter of 15.24 cm (6 inches)), the flow might be stratified. Another criterion to apply a stratified flow model may be a deviation close to horizontal and all probes except one measuring a water hold-up of 1 or 0. In case the automatic process recognizes an oil/water stratified flow, it will apply, for example, the flow model disclosed in the patent EP0519809.

According to the method of the invention, the step of defining the flow model can be achieved before any correction of the measurements, between two corrections or after the complete corrections step has been achieved. However, if the flow model has been selected prior to any correction or if other corrections have been done on the measurements after the selection of said flow model, it might be useful to check whether the flow model is still suitable. Moreover, if this model is changed it might be useful to check whether all the corrections that have been made are still coherent. In another way, corrections step and selection of the flow model will be achieved, in a kind of iterative way, until the volumetric fraction measurements and the velocity measurements fit the last selected flow model.

Figure 4:
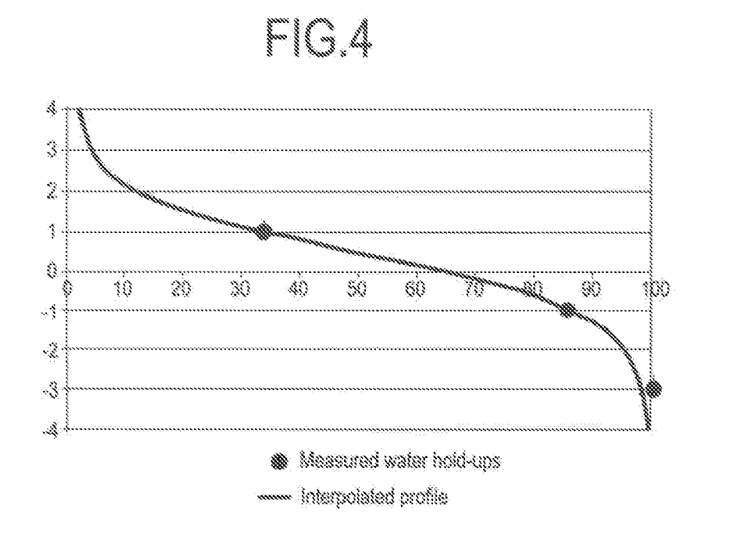
FIG. 4 represents an example of an interpolation according to a selected flow model and achieved on local hold-up measurements.

After the corrections step and the selection of the flow model have been achieved, the local velocity and volumetric fraction measurements will be interpolated. Actually, these measurements do not necessarily correspond perfectly to the input needed for the selected flow model. Consequently, a transition step is needed to convert these local measurements into an "inputable" format. This can be done by a simple unit conversion but it can also be a change in the physical nature of the data. For example, in a bi-phase liquid/gas flow occurring in a deviated well, the local velocity measurements represent the velocity of the mixture. Thus, it is neither the velocity of the fluid, nor the velocity of the gas. The interpolation step may apply on the local mixture velocity, from which the liquid velocity profile and the gas velocity profile will be deduced afterwards. However, it is also possible to interpolate the local liquid velocities on one side and interpolate the local gas velocities on the other side. In this case, one needs to deduce the liquid and gas local velocities before the interpolation step is achieved with both of these measurements. Actually, a second slippage model has to be used to calculate these local velocities from the measured mixture velocities. Any known model that is suitable to the type of effluent may be used. Then, the interpolation step is achieved on both the velocity measurements and the hold-up measurements according to the selected flow model. The example represented on FIG. 4 shows the result of an interpolation step, using a flow model based on the least squares method, achieved on four local water hold-up measurements acquired in a pipe having a diameter of 20.32 cm (8 inches).

The result of the interpolation step will give a set of profiles. For a tri-phase effluent, these profiles will be a water volumetric fraction (hold-up), an oil volumetric fraction, a gas volumetric fraction, a water velocity, an oil velocity and a gas velocity profile.

The latest step of the method of the invention is the calculation of the relative volumetric flow rates of the phases by integration of said volumetric fraction and/or velocity profiles over said section of the well at the depth where the local measurements have been acquired.

This interpolation is achieved according to the following formula:

$$Q_i(z) = \int_S v_i \cdot h_i \cdot dS$$

where z is the coordinate along the axis of the well (depth of the measurements), S is the current cross-sectional area, $v_i$ is the velocity profile of phase i (i=w, o or g) and $h_i$ is the volumetric fraction profile of phase i (i=w, o or g). It is thus seen at this stage that information concerning the geometry of the well is important in order to calculate the well cross-section area at any depth. This kind of information will be given by known calliper tool.

If both profiles $h_i$ and $v_i$ are functions of only one variable x (i.e., when the effluent flow in a deviated but circular well), then the calculation turns into:

$$Q_i(z) = \int_{-D/2}^{D/2} v_i \cdot h_i \cdot y(x) dx$$

where D is the diameter of the well, $v_i$ is the velocity profile of phase i (i=w, o or g), $h_i$ is the hold-up profile of phase i (i=w, o or g) and y(x) is the width of the well perpendicularly to the axis of coordinate x at position x.

If both profiles $h_i$ and $v_i$ are uniform, then the calculation turns into:

$$Q_i(z)=Vi(z).Hi(z).S(z)$$

where Vi(z) is the uniform value of $v_i$ at depth z, Hi(z) is the uniform value of $h_i$ at depth z, S(z) is the area of the well cross section at depth z.

The method of the invention thus permits to calculate the relative volumetric flow-rates of each phase of the effluent from local volumetric fraction and velocity measurements that have been acquired in the well, at a given depth. Re-applying this method at any depth of the well where local measurements have been acquired will give a view of the flow characteristics of the effluent. It will then be possible to manage the production of said well by focusing on certain zones and reducing the production of some others.

Figure 5:
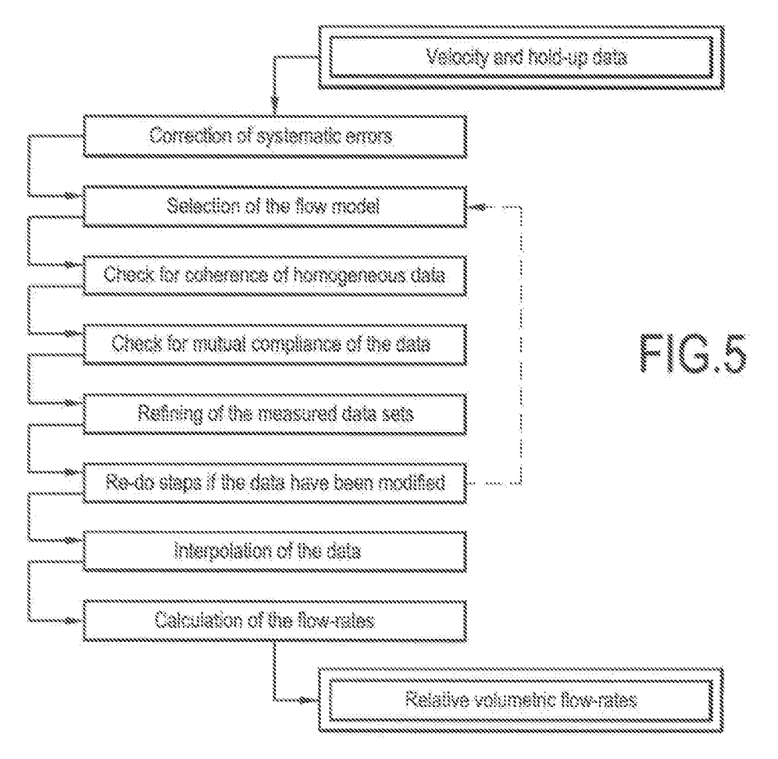
FIG. 5 is a schematic diagram of an example of flowchart implementing the method of the invention.

FIG. 5 is a schematic diagram of an example of flowchart implementing the method of the invention. The boxes represent the different steps of the method of the invention. It can be seen in this example of the method of the invention that a correction of systematic errors is made prior to the selection of the flow model. Moreover, the corrections that have been achieved after the selection of the flow model may lead to a new selection of said model, as said before.

Now, the method of the invention has been tested on a set of several data. In the following, the flow conditions of a tri-phase effluent are known and are such that: the pipe internal diameter is 6 inches, the deviation of the pipe is of 88°, the water volumetric flow rate is 10 m³/h, the oil volumetric flow rate is 10 m³/h and the gas volumetric flow rate is 6.9 m³/h. Before any measurement is made, the flow conditions are made stationary and stable. Nonetheless, the flow regime is non-stationary in such conditions: long bubbles of gas flow on top of a partly segregated oil/water stream.

The measurement device bears five velocity sensors (mini-spinners) spread at known positions along the vertical diameter of the pipe. In the same manner, six optical probes and six electrical probes respectively measure the water hold-up and the gas hold-up across the pipe.

The data used for this example are the ones measured with the above sensors averaged over a period of time close to 1 minute, plus some miscellaneous parameters (rheology of the fluids, sensors positions, . . . ).

The flow model selection is a choice of the user in this application. FIGS. 6a to 6c and 7a to 7c describe the successive steps that lead to the relative volumetric flow rates.

Figure 6A:
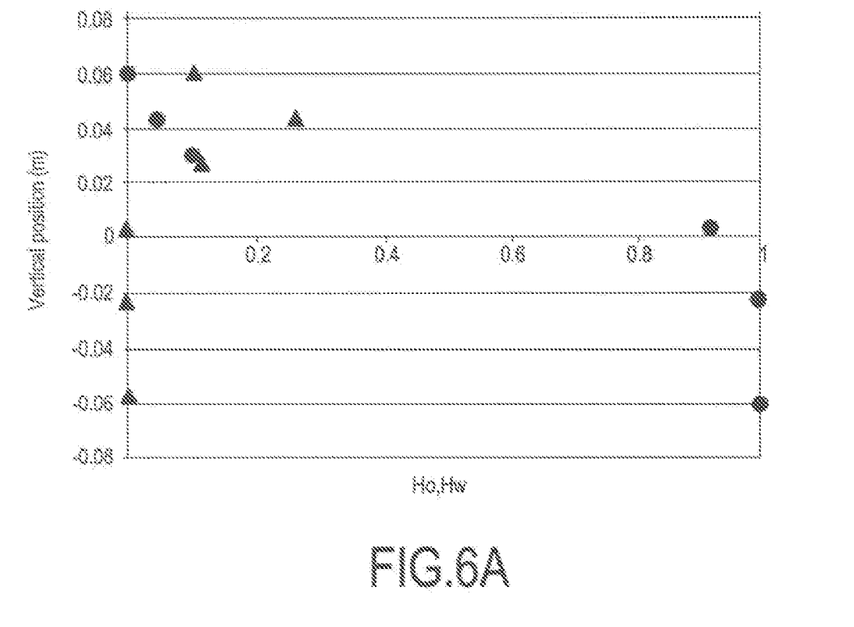
FIGS. 6a, 6b and 6c show plots of hold-up values measured and determined according to the invention.
Figure 6B:
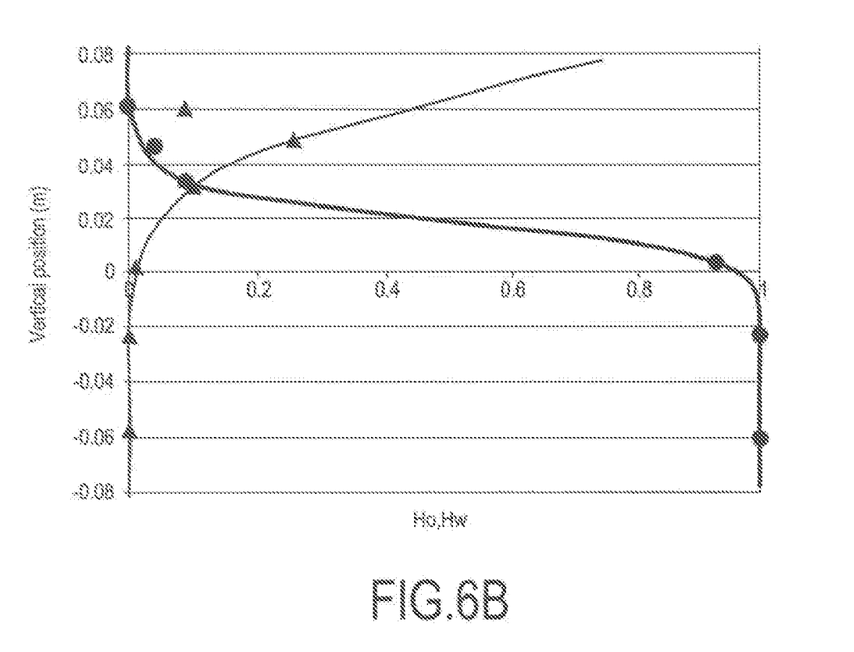
Figure 6C:
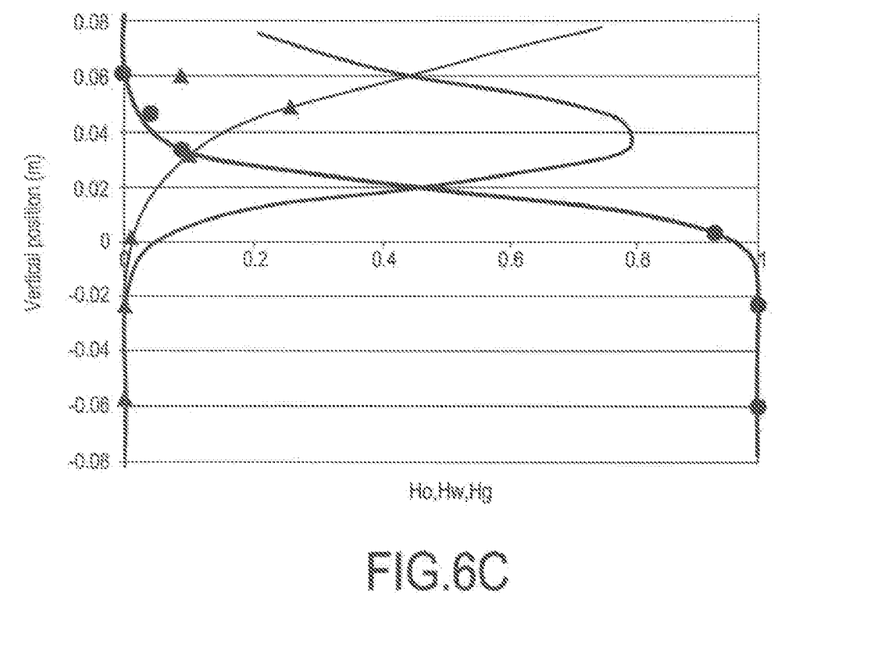

FIG. 6a represents hold-up values ◇ that have been measured by the six electrical probes and holdup values Δ that have been acquired with the optical probes. FIG. 6b represents the interpolated profiles that have been acquired through the method of the invention for both the water hold-up (curve A) and the gas hold-up (curve B). The flow model that has been chosen for implementing the method of the invention is the one based on the least squares method. FIG. 6c additionally shows the oil hold-up profile (curve C) that has been obtained by simple subtraction of the two other profiles.

Figure 7A:
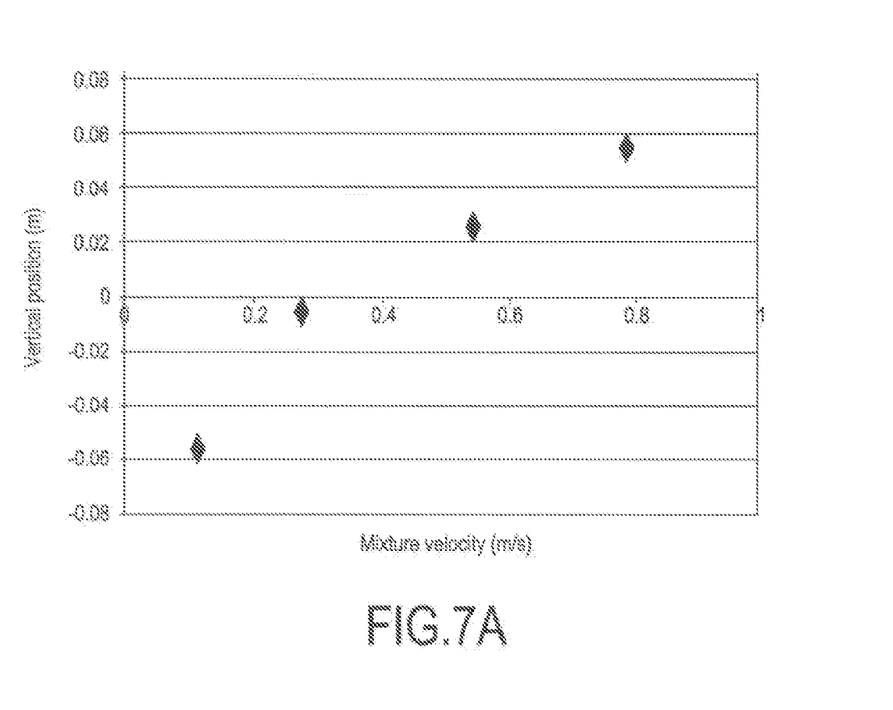
FIGS. 7a, 7b and 7c show plots of velocity values measured and determined according to the invention.
Figure 7B:
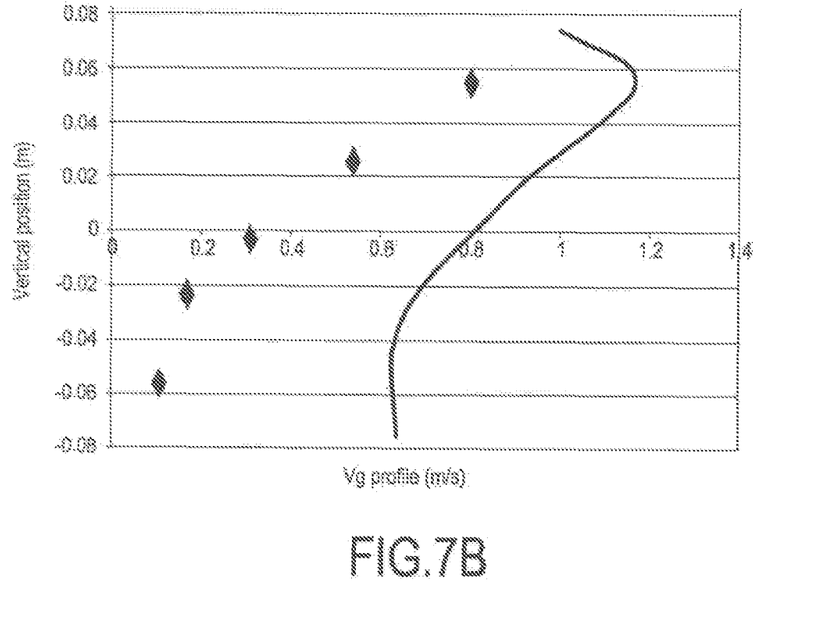
Figure 7C:
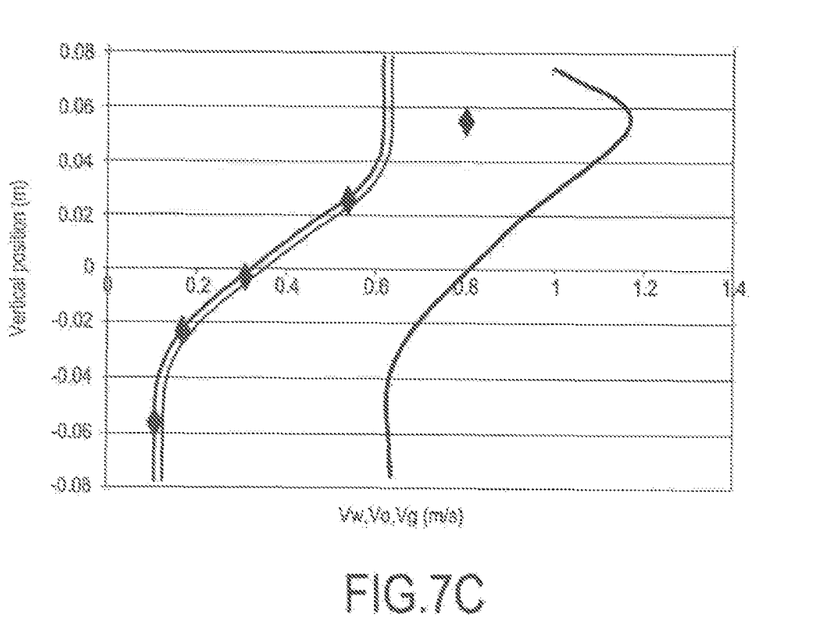

FIGS. 7a represents the measured local velocities ◇ of the mixture that are deduced from the rotational velocities of the five spinners (taking the calibration of these spinners into account). FIG. 7b shows the curve corresponding to a gas velocity profile that has been deduced by using the interpolated gas hold-up profile and a gas/liquid slippage velocity obtained with a slippage model according to the method of the invention. FIG. 7c additionally represents the oil and water velocity profiles, respectively (curves C and A), that have been defined using the liquid velocity profile (calculated with the interpolated oil and water hold-up profiles) and a slippage model and the oil/water slippage velocity in the method of the invention. The last step of the method gives the phases volumetric flow rates on the basis of these profiles: Qw=9.64 m³/h, Qo=9.92 m³/h, Qg=6.52 m³/h. These values show that the method of the invention can give very satisfactory results from data measured in a tri-phase flow.

The model of the invention thus leads to volumetric fraction and velocity profile for each phase of the effluent flowing in the well, said profile being as close as possible to the real flow conditions: actually, most of the factors that may distort the local measurements are carefully identified and corrected, while keeping all these measurements coherent with each other.

The invention claimed is:

1. A method for calculating the relative volumetric flow-rates of at least one of the phases of a multiphase effluent flowing in a well, said method comprising a first step of acquiring local volumetric fractions and/or velocities of said phases across a section of the well at a certain depth, and wherein the method further comprises:
   correcting said local volumetric fraction and/or velocity measurements in order to make them consistent with each other and/or with the effluent flow conditions;
   selecting a suitable flow model mathematically representing the effluent flow, the flow model being a combination of a predetermined hold-up profile and a velocity that corresponds to a known flow pattern;
   interpolating said local volumetric fractions measurements and/or said local velocity measurements by the selected flow model in order to obtain a volumetric fraction profile and/or a velocity profile for at least one phase of the effluent across said section of the well at said depth;
   calculating the relative volumetric flow rates of said at least one phase by integration of said volumetric fraction and/or velocity profiles over said section of the well at said depth,
   using said relative volumetric flow rates in operations related to a well in production.

2. The method according to claim 1, wherein the correcting step comprises correction of the systematic measurement errors due to measurement means.

3. The method according to claim 1, wherein the correcting step comprises checking coherence of the local volumetric fraction measurements between themselves and/or coherence of the local velocity measurements between themselves.

4. The method according to claim 1, wherein the correcting step comprises checking for mutual coherence between the local volumetric fraction measurements and the local velocity measurements.

5. The method according to claim 1, wherein the correcting step comprises refining the local volumetric fraction measurements and the local velocity measurements.

6. The method according to claim 1, wherein the step of selecting the suitable flow model is automatically done by the analysis of the set of volumetric fractions and/or velocity measurements.

7. The method according to claim 1, further comprising the following steps:
- measuring the velocity of the cable with which the volumetric fractions and velocity measurements means are lowered in the well;
- determining the geometric characteristics of the well.

8. The method according to claim 1, further comprising the determination of the relative bearing of the well.

9. The method according to claim 1, wherein the step of selecting the flow model is verified alter some corrections have been done on the local volumetric fraction and velocity measurements.

10. The method according to claim 1, wherein the steps are achieved as follows:
- correcting the systematic measurement errors due to measurement means;
- selecting a suitable flow model;
- checking coherence of the local volumetric fraction measurement between themselves and/or coherence of the local velocity measurements between themselves;
- checking for mutual coherence between the local volumetric fraction measurements and the local velocity measurements;
- refining the local volumetric fraction measurements and the local velocity measurements thanks to the result of the analysis respectively of the local velocity measurements and the local volumetric fraction measurements;
- re-doing the previous steps until the local volumetric fraction and/or velocity measurements fit the flow model that has been selected;
- interpolating said local volumetric fraction measurements and/or said local velocity measurements by the selected flow model in order to obtain a volumetric fraction profile and/or a velocity profile for at least one phase of the effluent across said section of the well at said depth;
- calculating the relative volumetric flow rates of said at least one phase by integration of said volumetric fraction and/or velocity profiles over said section of the well at said depth.

11. The method according to claim 1, wherein the local volumetric fraction measurements are the water volumetric fraction and/or the gas volumetric fraction in the well effluent, the oil volumetric fraction in the effluent being deduced from the previous one(s).

12. The method according to claim 1, wherein the local velocity measurements are acquired by a set of spinners.

* * * * *